United States Patent
Morita

(10) Patent No.: US 10,028,127 B2
(45) Date of Patent: *Jul. 17, 2018

(54) COMMUNICATION CONTROL METHOD, MANAGEMENT SERVER, AND USER TERMINAL

(71) Applicant: KYOCERA CORPORATION, Kyoto (JP)

(72) Inventor: Kugo Morita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/670,793

(22) Filed: Aug. 7, 2017

(65) Prior Publication Data

US 2017/0339549 A1    Nov. 23, 2017

Related U.S. Application Data

(63) Continuation of application No. 15/257,251, filed on Sep. 6, 2016, now Pat. No. 9,730,048, which is a (Continued)

(30) Foreign Application Priority Data

Mar. 7, 2014    (JP) .................................. 2014-045608

(51) Int. Cl.
    *H04W 4/00*    (2018.01)
    *H04W 72/00*    (2009.01)
    (Continued)

(52) U.S. Cl.
    CPC .............. *H04W 8/005* (2013.01); *H04W 8/24* (2013.01); *H04W 84/042* (2013.01)

(58) Field of Classification Search
    CPC ...... H04W 8/005; H04W 8/24; H04W 84/042
    (Continued)

(56) References Cited

U.S. PATENT DOCUMENTS 6,134,443 A    10/2000    Spann et al.
2008/0242292 A1    10/2008    Koskela et al.
(Continued)

OTHER PUBLICATIONS

International Search Report issued in PCT/JP2015/056478; dated Jun. 9, 2015.

(Continued)

*Primary Examiner* — Rafael Perez-Gutiérrez
*Assistant Examiner* — Mark G. Pannell
(74) *Attorney, Agent, or Firm* — Studebaker & Brackett PC

(57) ABSTRACT

A communication control method, and network apparatus includes receiving a first identifier from a first user terminal, where the first identifier is included in a discovery signal which the first user terminal has received from a second user terminal, determining, in response to receiving the first identifier, whether the first identifier is an identifier allocated in the first PLMN. In response to a determination that the first identifier is not the identifier allocated in the first PLMN, sending the first identifier to a second network apparatus belonging to a second PLMN, and receiving the information of an application used by the second user terminal, from the second network apparatus. In response to the controller determining that the first identifier is the identifier allocated in the first PLMN, transmitting, to the first user terminal, information of the application used by the second user terminal.

3 Claims, 12 Drawing Sheets

Related U.S. Application Data continuation of application No. PCT/JP2015/056478, filed on Mar. 5, 2015.

(51) Int. Cl.
*H04W 8/00* (2009.01)
*H04W 8/24* (2009.01)
*H04W 84/04* (2009.01)

(58) Field of Classification Search
USPC ...................................................... 455/422.1
See application file for complete search history.

(56) References Cited

U.S. PATENT DOCUMENTS

| | | |
|---|---|---|
| 2010/0130159 A1 | 5/2010 | Wu et al. |
| 2012/0210397 A1 | 8/2012 | Suh et al. |
| 2013/0136072 A1 | 5/2013 | Bachmann et al. |
| 2013/0301540 A1 | 11/2013 | Draznin et al. |
| 2013/0339438 A1 | 12/2013 | Cherian et al. |
| 2014/0056220 A1 | 2/2014 | Poitau et al. |
| 2014/0141777 A1 | 5/2014 | Guo |
| 2014/0274066 A1 | 9/2014 | Fodor et al. |
| 2014/0304777 A1 | 10/2014 | Lehtovirta et al. |
| 2015/0365914 A1 | 12/2015 | Yu et al. |
| 2016/0150390 A1 | 5/2016 | Chen et al. |

OTHER PUBLICATIONS

3rd Generation Partnership Project; Technical Specification Group RAN; Study on LTE Device to Device Proximity Services—Radio Aspects; 3GPP TR 36.843; V1.0.0; Nov. 2013; pp. 1-32; Release 12; 3GPP Organizational Partners.

Broadcom Corporation; "Updates to ProSe Discovery Solution D11"; SA WG2 Meeting #100; S2-134229; Nov. 11-15, 2013; San Francisco, CA, USA.

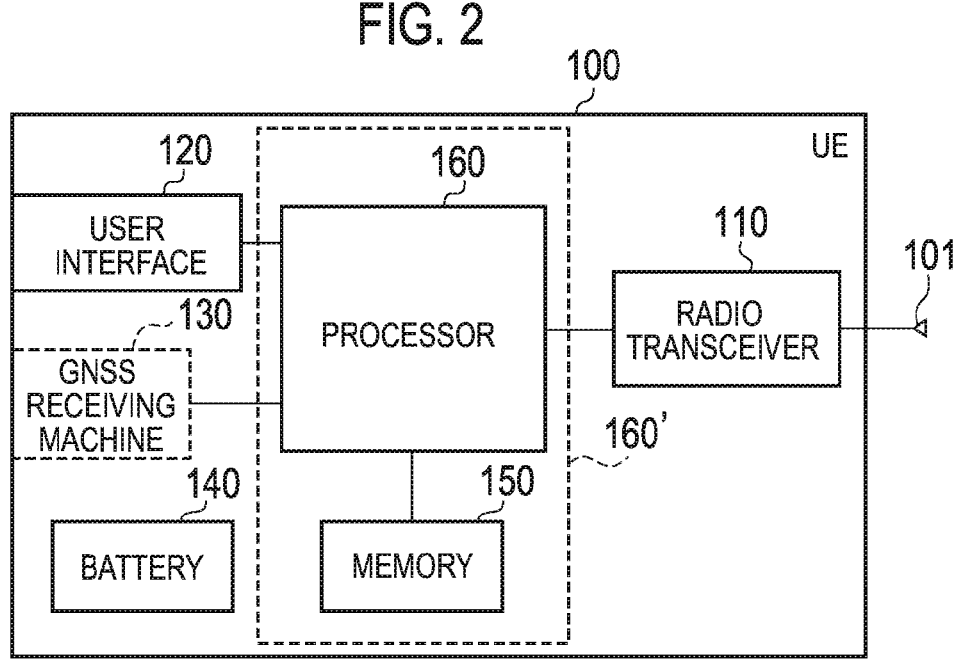
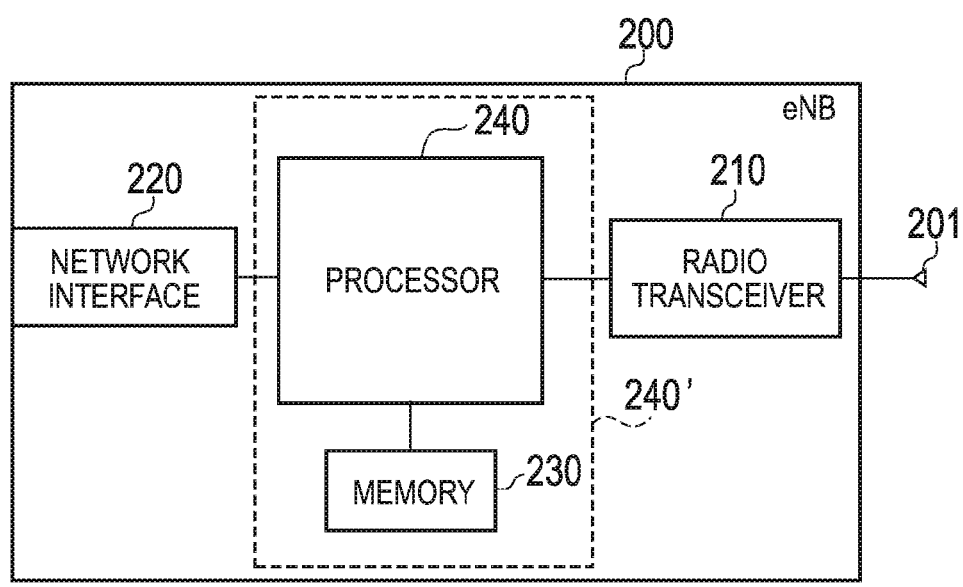

COMMUNICATION CONTROL METHOD, MANAGEMENT SERVER, AND USER TERMINAL

CROSS REFERENCE TO RELATED APPLICATIONS

This application is a Continuation application of U.S. patent application Ser. No. 15/257,251 filed Sep. 6, 2016, which is a Continuation application of International Patent Application No. PCT/JP2015/056478 filed Mar. 5, 2015, which claims benefit of Japanese Patent Application No. 2014-045608 filed Mar. 7, 2014, the entirety of all applications hereby expressly incorporated by reference.

TECHNICAL FIELD

The present disclosure relates to a communication control method, and a network apparatus.

BACKGROUND

In 3GPP (3rd Generation Partnership Project) which is a project aiming to standardize a mobile communication system, the introduction of a Device to Device (D2D) proximity service is discussed as a new function in Release 12 and later (see Non Patent Document 1).

The D2D proximity service (D2D ProSe) is a service enabling direct device-to-device communication within a synchronization cluster formed by a plurality of synchronized user terminals. The D2D proximity service includes: a D2D discovery procedure (Discovery) in which a proximal terminal is discovered; and D2D communication (Communication) that is direct device-to-device communication.

CITATION LIST

Non-Patent Document

Non Patent Document 1: 3GPP Technical Report "TR 36.843 V1.0.0" Jan. 16, 2014

SUMMARY

A communication control method according to an embodiment includes directly transmitting, from a second user terminal to a first user terminal, discovery signal including a first identifier associated with the second user terminal, where the discovery signal is for discovering another user terminal, transmitting, from the first user terminal to a first network apparatus belonging to a first Public Land Mobile Network (PLMN), and the first identifier included in the discovery signal, and determining, by the first network apparatus, in response to receiving the first identifier, whether the first identifier is an identifier allocated in the first PLMN. In response to the first network apparatus determining that the first identifier is not the identifier allocated in the first PLMN, the method includes sending the first identifier from the first network apparatus to a second network apparatus belonging to a second PLMN, and sending, from the second network apparatus to the first network apparatus, information of an application used by the second user terminal. In response to the first network apparatus determining that the first identifier is the identifier allocated in the first PLMN, the method includes transmitting, from the first network apparatus to the first user terminal, information of the application used by the second user terminal.

A first network apparatus according to an embodiment is configured to belong to a first Public Land Mobile Network (PLMN), and include a controller including a processor and a memory coupled to the processor, where the controller is configured to receive a first identifier from a first user terminal, where the first identifier is included in a discovery signal which the first user terminal has received from a second user terminal. The controller is configured to determine, in response to receiving the first identifier, whether the first identifier is an identifier allocated in the first PLMN. In response to the controller determining that the first identifier is not the identifier allocated in the first PLMN, the controller sends the first identifier to a second network apparatus belonging to a second PLMN, and receives the information of an application used by the second user terminal, from the second network apparatus. In response to the controller determining that the first identifier is the identifier allocated in the first PLMN, the controller transmits, to the first user terminal, information of the application used by the second user terminal.

A second network apparatus according to an embodiment belongs to a second Public Land Mobile Network (PLMN), and includes a controller including a processor and a memory coupled to the processor. The controller is configured to receive a first identifier from a first network apparatus belonging to a first PLMN in response to the first network apparatus determining that the first identifier is not an identifier allocated in the first PLMN. The controller is configured to send information of an application used by a second user terminal associated with the first identifier, to the first network apparatus. The first identifier is received in the first network apparatus from a first user terminal that directly received a discovery signal including the first identifier from the second user terminal, and the discovery signal is for discovering another user terminal.

BRIEF DESCRIPTION OF THE DRAWINGS

FIG. 2 is a block diagram of a UE according to the embodiment.

FIG. 3 is a block diagram of an eNB according to the embodiment.

DESCRIPTION OF THE EMBODIMENT

Overview of Embodiment

Figure 1:
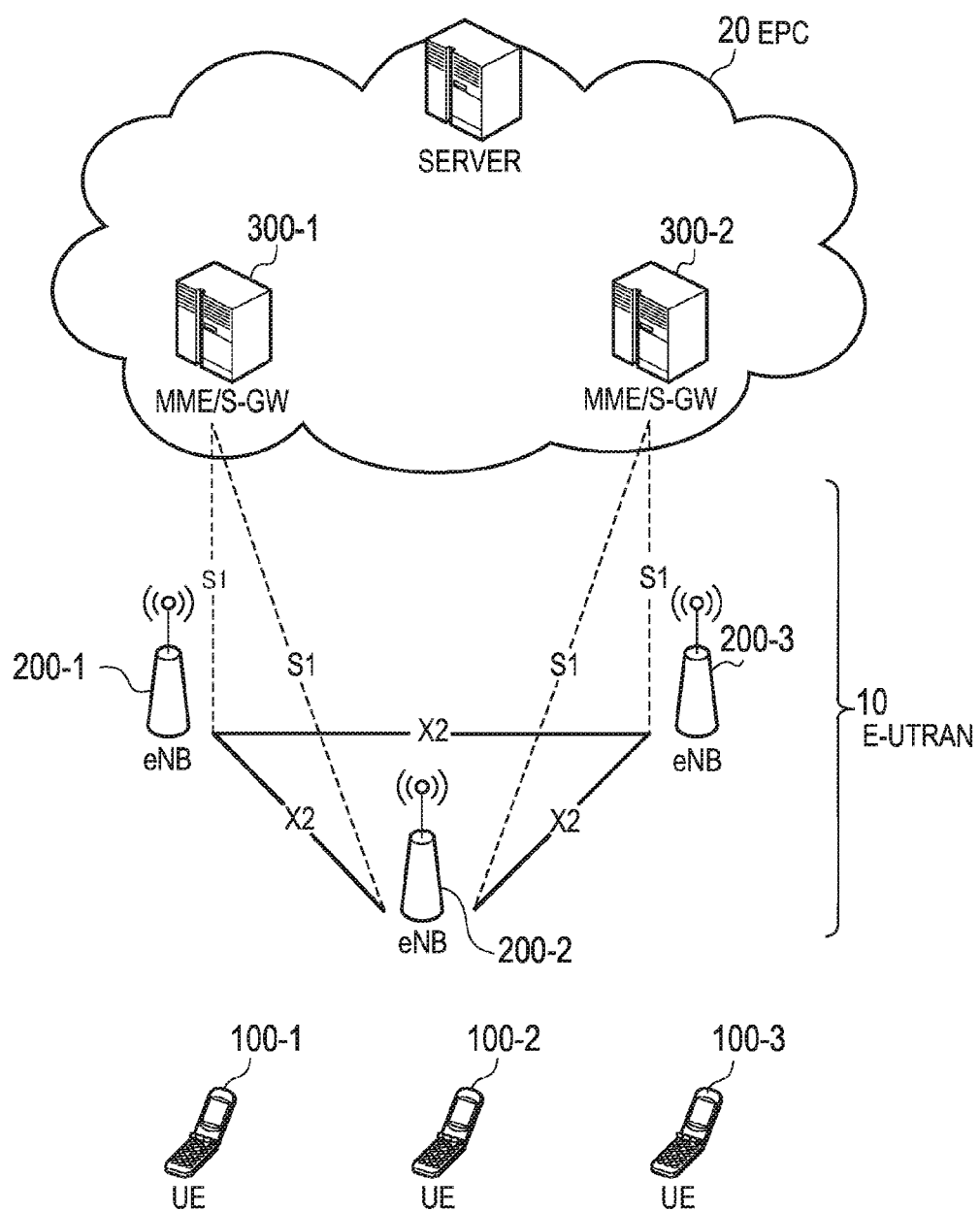
FIG. 1 is a configuration diagram of an LTE system according to an embodiment.

A communication control method according to an embodiment comprises: receiving, by a first network apparatus, first information from a first user terminal, the first network apparatus configured to belong to a first Public Land Mobile Network (PLMN); and notifying, the first network apparatus, the first user terminal of second information. The first information includes a first identifier included in a discovery signal which the first user terminal has directly received from a second user terminal. The second information includes information corresponding to the first identifier. The communication control method further comprises determining, by the first network apparatus, in response to receiving the first information, whether the first identifier is a second identifier allocated in the first PLMN. The first network apparatus notifies the first user terminal of the second information in response to determining that the first identifier is the second identifier.

The communication control method may further comprise: sending, by the first network apparatus, the first information to a second network apparatus configured to belong to a second PLMN, in response to determining that the first identifier is not the second identifier, and receiving, by the first network apparatus, the second information from the second network apparatus.

The first information may include an identifier of a PLMN in which the user terminal has received the discovery signal.

A network apparatus according to an embodiment is a network apparatus configured to belong to a first Public Land Mobile Network (PLMN). The network apparatus comprises: a controller including a processor and a memory coupled to the processor. The controller is configured to receive first information from a first user terminal; and notifying the first user terminal of second information. The first information includes a first identifier included in a discovery signal which the first user terminal has directly received from a second user terminal. The second information includes information corresponding to the first identifier. The controller is configured to determine, in response to receiving the first information, whether the first identifier is a second identifier allocated in the first PLMN, and notifying the first user terminal of the second information in response to determining that the first identifier is the second identifier.

A network apparatus according to an embodiment is a network apparatus configured to belong to a second Public Land Mobile Network (PLMN). The network apparatus comprises: a controller including a processor and a memory coupled to the processor. The controller is configured to receive first information from another network apparatus configured to belong to a first PLMN; and sending second information to the another network apparatus. The first information includes a first identifier included in a discovery signal which a first user terminal has directly received from a second user terminal. The second information includes information corresponding to the first identifier. The controller is configured to specify the information corresponding to the first identifier in response to receiving the first information.

Here, a case is assumed where a user terminal receives a D2D discovery signal to be transmitted in a D2D discovery procedure, from another user terminal belonging to a different PLMN (Public Land Mobile Network).

A management server belonging to the PLMN to which the user terminal belongs, does not manage information on the other user terminal belonging to the different PLMN. Thus, there is a problem that even when inquiring the management server of the information on the transmission-source terminal to determine whether or not to perform D2D communication, the user terminal is not capable of knowing the information on the transmission terminal.

Therefore, an object of the present disclosure is to enable a user terminal that has received a D2D discovery signal to know information on a transmission-source terminal of the D2D discovery signal, even when receiving a D2D discovery signal from another user terminal belonging to a different PLMN.

A communication control method according to an embodiment is a communication control method for controlling D2D communication that is direct Device-to-Device communication. The communication control method comprises: a step of transmitting, by a user terminal that receives a D2D discovery signal transmitted in a D2D discovery procedure for discovering a proximal terminal, an inquiry as to a transmission-source terminal of the received D2D discovery signal; a step of receiving, by a management server, the inquiry, wherein the management server manages at least either one of a local Discovery identifier or a global Discovery identifier, the local Discovery identifier assigned to a terminal in each of a plurality of PLMNs, and the global Discovery identifier assigned to the terminal irrespective of any one of the plurality of PLMNs; and a step of notifying, by the management server that receives the inquiry, the user terminal of predetermined information on the transmission-source terminal of the D2D discovery signal. In the step of transmitting the inquiry, the user terminal transmits the inquiry including a Discovery identifier included in the received D2D discovery signal. In the step of notifying the predetermined information, the management server notifies, on a basis of the Discovery identifier included in the inquiry, the user terminal of the predetermined information.

In the embodiment, a management node configured to be arranged within a first PLMN and be different from the management server manages a Discovery identifier assigned, in the first PLMN, to a terminal. The communication control method further comprises: a step of receiving, by the management node, the inquiry; and a step of notifying, by the management node that receives the inquiry, instead of the management server, the user terminal of the predetermined information, on a basis of the Discovery identifier included in the inquiry, if the transmission-source terminal of the D2D discovery signal belongs to the first PLMN.

The communication control method according to the embodiment further comprises a step of transferring, by the management node, the inquiry to the management server, if the transmission-source terminal of the D2D discovery signal does not belong to the first PLMN.

In the communication control method, the management server manages at least the global Discovery identifier. The communication control method further comprises: a step of transferring, by the management node, the inquiry to the management server, if the Discovery identifier included in the inquiry is the global Discovery identifier.

The communication control method according to the embodiment further comprises a step of transferring, by the management node, the inquiry to the management server, if identification information related to the management node is not included in the inquiry.

In the embodiment, the identification information related to the management node is an identifier indicating a PLMN to which the management node belongs.

In the communication control method, a base station configured to be arranged within the first PLMN manages a Discovery identifier assigned to a terminal that exists in a self cell, out of Discovery identifiers assigned, in the first PLMN, to the terminal. The communication control method further comprises: a step of receiving, by the base station, the inquiry from the user terminal that exists in the self cell; and a step of notifying, by the base station that receives the inquiry, instead of the management server and the management node, the user terminal of the predetermined information, on a basis of the Discovery identifier included in the inquiry, if the transmission-source terminal of the D2D discovery signal exists in the self cell.

The communication control method according to the embodiment further comprises a step of transferring, by the base station, the inquiry to the management node or the management server, if the transmission-source terminal of the D2D discovery signal does not exist in the self cell.

In the communication control method, the management server manages at least the global Discovery identifier. The communication control method further comprises: a step of transferring, by the base station, the inquiry to the management server, if the Discovery identifier included in the inquiry is the global Discovery identifier.

The communication control method according to the embodiment further comprises a step of transferring, by the base station, the inquiry to the management node or the management server, if identification information related to the base station is not included in the inquiry.

In the embodiment, the identification information related to the base station is an identifier indicating the base station or an identifier indicating the self cell.

In the embodiment, another management node configured to be arranged within a second PLMN and be different from the management server manages a Discovery identifier assigned, in the second PLMN, to a terminal. The communication control method further comprises: a step of transferring, by the management server that receives the inquiry or the management node that receives the inquiry, the inquiry to the another management node, if the transmission-source terminal of the D2D discovery signal belongs to the second PLMN.

The communication control method according to the embodiment further comprises a step of receiving, by the user terminal, from another cell different from a cell in which the user terminal exists, identification information related to the another cell. In the step of transmitting the inquiry by the user terminal, the user terminal transmits the inquiry including the identification information related to the another cell.

In the embodiment, the predetermined information includes a terminal identifier indicating the transmission-source terminal of the D2D discovery signal.

In the embodiment, the predetermined information includes information indicating at least either one of: a content of the D2D communication performed by the transmission-source terminal of the D2D discovery signal; or an application used for the D2D communication performed by the transmission-source terminal of the D2D discovery signal.

A management server according to an embodiment is used in a mobile communication system supporting D2D communication that is direct Device-to-Device communication. The management server comprises: a receiver configured to receive from a user terminal that receives a D2D discovery signal transmitted in a D2D discovery procedure for discovering a proximal terminal, an inquiry as to a transmission-source terminal of the received D2D discovery signal; and a controller configured to manage at least either one of a local Discovery identifier or a global Discovery identifier, the local Discovery identifier assigned to a terminal in each of a plurality of PLMNs, and the global Discovery identifier assigned to the terminal irrespective of any one of the plurality of PLMNs. The controller performs control to notify the user terminal of predetermined information on the transmission-source terminal of the D2D discovery signal. The receiver receives the inquiry including the Discovery identifier included in the received D2D discovery signal. The controller performs, on a basis of the Discovery identifier included in the inquiry, control to notify the user terminal of the predetermined information.

A user terminal according to an embodiment is used in a mobile communication system supporting D2D communication that is direct Device-to-Device communication. The user terminal comprises: a receiver configured to receive a D2D discovery signal transmitted in a D2D discovery procedure for discovering a proximal terminal; and a transmitter configured to transmit an inquiry as to a transmission-source terminal of the received D2D discovery signal, to a management server configured to manage at least either one of a local Discovery identifier or a global Discovery identifier, the local Discovery identifier assigned to a terminal in each of a plurality of PLMNs, and the global Discovery identifier assigned to the terminal irrespective of any one of the plurality of PLMNs. The transmitter transmits the inquiry including a Discovery identifier included in the received D2D discovery signal.

Embodiment

Hereinafter, a description will be provided for an embodiment when the present disclosure is applied to an LTE system.

(System Configuration)

FIG. 1 is a configuration diagram of the LTE system according to the embodiment. As illustrated in FIG. 1, the LTE system according to the embodiment includes a plurality of UEs (User Equipments) 100, E-UTRAN (Evolved-UMTS Terrestrial Radio Access Network) 10, and EPC (Evolved Packet Core) 20.

The UE 100 corresponds to the user terminal. The UE 100 is a mobile communication device and performs radio communication with a connected cell (a serving cell). A configuration of the UE 100 will be described later.

The E-UTRAN 10 corresponds to a radio access network. The E-UTRAN 10 includes eNBs 200 (evolved Node-Bs). The eNB 200 corresponds to a base station. The eNB 200 corresponds to the base station. The eNBs 200 are connected mutually via an X2 interface. A configuration of the eNB 200 will be described later.

The eNB 200 manages a cell or a plurality of cells and performs radio communication with UE 100 established a connection with the own cell. The eNB 200, for example, has a radio resource management (RRM) function, a routing function of user data, and a measurement control function for mobility control and scheduling. It is noted that the "cell" is used as a term indicating a minimum unit of a radio communication area, and is also used as a term indicating a function of performing radio communication with the UE 100.

The EPC 20 corresponds to a core network. The E-UTRAN 10 and the EPC 20 constitute a network of the LTE system (LTE network). The EPC 20 includes MMEs (Mobility Management Entities)/S-GWs (Serving-Gateways) 300 and Management servers (Servers #1 to #3). The MME is a network node for performing various mobility controls, for example, for the UE 100. The S-GW performs transfer control of user data. The MME/S-GW 300 is connected to the eNBs 200 via an S1 interface. The management server manages information on a Discovery signal. The management server will be described in detail later.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 corresponds to storage, and the processor 160 corresponds to a controller. The UE 100 may not have the GNSS receiver 130. Furthermore, the memory 150 may be integrally formed with the processor 160, and this set (that is, a chipset) may be called a processor 160'.

The antennas 101 and the radio transceiver 110 are used to transmit and receive a radio signal. The radio transceiver 110 converts a baseband signal (transmission signal) output from the processor 160 into the radio signal, and transmits the radio signal from the antennas 101. Furthermore, the radio transceiver 110 converts the radio signal received by the antennas 101 into the baseband signal (reception signal), and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for a process by the processor 160. The processor 160 includes a baseband processor that performs modulation and demodulation, encoding and decoding and the like of the baseband signal, and a CPU (Central Processing Unit) that performs various processes by executing the program stored in the memory 150. The processor 160 may further include a codec that performs encoding and decoding of sound and video signals. The processor 160 implements various processes and various communication protocols described later.

FIG. 3 is a block diagram of the eNB 200. As illustrated in FIG. 3, the eNB 200 includes an antenna 201, a radio transceiver 210, a network interface 220, a memory 230, and a processor 240. Furthermore, the memory 230 may be integrally formed with the processor 240, and this set (that is, a chipset) may be called a processor 240'.

The antennas 201 and the radio transceiver 210 are used to transmit and receive a radio signal. The radio transceiver 210 converts the baseband signal (transmission signal) output from the processor 240 into the radio signal, and transmits the radio signal from the antennas 201. Furthermore, the radio transceiver 210 converts the radio signal received by the antennas 201 into the baseband signal (reception signal), and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240. The processor 240 includes the baseband processor that performs modulation and demodulation, encoding and decoding and the like of the baseband signal and a CPU that performs various processes by executing the program stored in the memory 230. The processor 240 implements various processes and various communication protocols described later.

Figure 4:
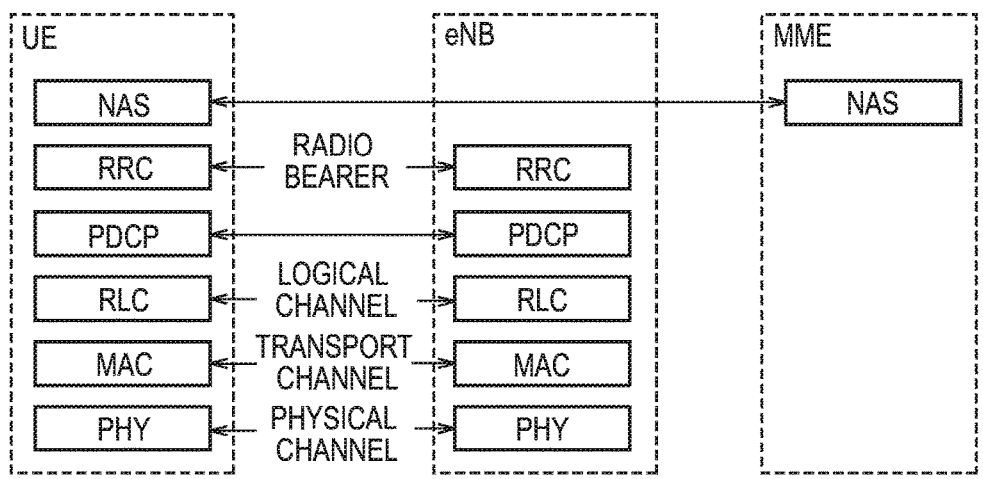
FIG. 4 is a protocol stack diagram according to the embodiment.

FIG. 4 is a protocol stack diagram of a radio interface in the LTE system. As illustrated in FIG. 4, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, user data and control signal are transmitted via the physical channel.

The MAC layer performs preferential control of data, and a retransmission process and the like by hybrid ARQ (HARQ). Between the MAC layer of the UE 100 and the MAC layer of the eNB 200, user data and control signal are transmitted via a transport channel. The MAC layer of the eNB 200 includes a scheduler for determining (scheduling) a transport format (a transport block size, a modulation and coding scheme) of an uplink and a downlink, and an assignment resource block to the UE 100.

The RLC layer transmits data to an RLC layer of a reception side by using the functions of the MAC layer and the PHY layer. Between the RLC layer of the UE 100 and the RLC layer of the eNB 200, user data and control signal are transmitted via a logical channel.

The PDCP layer performs header compression and decompression, and encryption and decryption.

The RRC layer is defined only in a control plane handling a control signal. Between the RRC layer of the UE 100 and the RRC layer of the eNB 200, a control signal (an RRC message) for various types of setting is transmitted. The RRC layer controls the logical channel, the transport channel, and the physical channel in response to establishment, re-establishment, and release of a radio bearer. When there is a connection (an RRC connection) between the RRC of the UE 100 and the RRC of the eNB 200, the UE 100 is in a RRC connected state and otherwise, the UE 100 is in an RRC idle state.

A NAS (Non-Access Stratum) layer positioned above the RRC layer performs session management or mobility management, for example.

Figure 5:
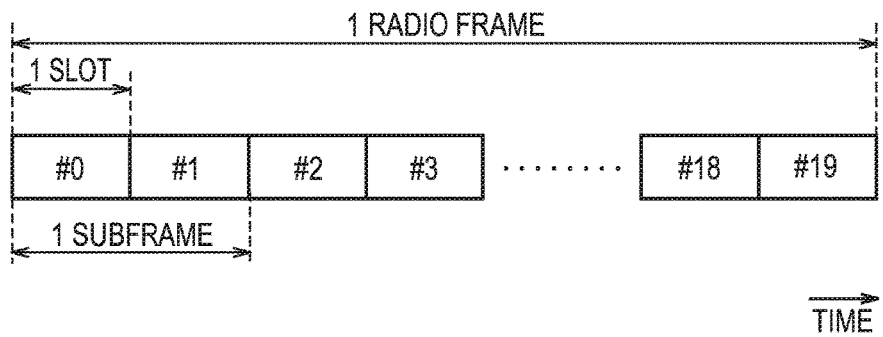
FIG. 5 is a configuration diagram of a radio frame according to the embodiment.

FIG. 5 is a configuration diagram of a radio frame used in the LTE system. In the LTE system, OFDMA (Orthogonal Frequency Division Multiplexing Access) is applied to a downlink (DL), and SC-FDMA (Single Carrier Frequency Division Multiple Access) is applied to an uplink (UL), respectively.

As illustrated in FIG. 5, the radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each resource block includes a plurality of subcarriers in the frequency direction. Among radio resources (time-frequency resources) allocated to the UE 100, a frequency resource can be specified by a resource block and a time resource can be specified by a subframe (or slot).

(D2D Proximity Service)

A D2D proximity service will be described, below. An LTE system according to an embodiment supports the D2D proximity service. The D2D proximity service is described in Non Patent Document 1, and an outline thereof will be described here.

The D2D proximity service (D2D ProSe) is a service enabling direct UE-to-UE communication within a synchronization cluster formed by a plurality of synchronized UEs 100. The D2D proximity service includes a D2D discovery procedure (Discovery) in which a proximal UE is discovered and D2D communication (Communication) that is direct UE-to-UE communication. The D2D communication is also called Direct communication.

A scenario in which all the UEs 100 forming the synchronization cluster are located in a cell coverage is called "In coverage". A scenario in which all the UEs 100 forming the synchronization cluster are located out of a cell coverage is called "Out of coverage". A scenario in which some UEs 100 in the synchronization cluster are located in a cell coverage and the remaining UEs 100 are located out of the cell coverage is called "Partial coverage".

In "In coverage", the eNB 200 is a D2D synchronization source, for example. A D2D asynchronization source is synchronized with the D2D synchronization source without transmitting a D2D synchronization signal. The eNB 200 that is a D2D synchronization source transmits, by a broadcast signal, D2D resource information indicating a radio resource available for the D2D proximity service. The D2D resource information includes information indicating a radio resource available for the D2D discovery procedure (Discovery resource information) and information indicating a radio resource available for the D2D communication (Communication resource information), for example. The UE 100 that is a D2D asynchronization source performs the D2D discovery procedure and the D2D communication on the basis of the D2D resource information received from the eNB 200.

In "Out of coverage" or "Partial coverage", the UE 100 is a D2D synchronization source, for example. In "Out of coverage", the UE 100 that is a D2D synchronization source transmits D2D resource information indicating a radio resource available for the D2D proximity service, by a D2D synchronization signal, for example. The D2D synchronization signal is a signal transmitted in a D2D synchronization procedure in which device-to-device synchronization is established. The D2D synchronization signal includes a D2DSS and a physical D2D synchronization channel (PD2DSCH). The D2DSS is a signal for providing a synchronization standard of a time and a frequency. The PD2DSCH is a physical channel through which more information is conveyed than the D2DSS. The PD2DSCH conveys the above-described D2D resource information (Discovery resource information, Communication resource information). Alternatively, if the D2DSS is associated with the D2D resource information, the PD2DSCH may be rendered unnecessary.

The D2D discovery procedure is used mainly if the D2D communication is performed by unicast. One UE 100 uses any particular radio resource out of radio resources available for the D2D discovery procedure if starting the D2D communication with another UE 100 to transmit the Discovery signal (D2D discovery signal). The other UE 100 scans the Discovery signal within the radio resource available for the D2D discovery procedure if starting the D2D communication with the one UE 100 to receive the Discovery signal. The Discovery signal may include information indicating a radio resource used by the one UE 100 for the D2D communication.

(Discovery Signal List)

A discovery signal list will be described, below. The discovery signal list is a list regarding a Discovery identifier assigned to the UE 100 that transmits the D2D discovery signal. In the discovery signal list, a Discovery identifier assigned to the UE 100 and a UE identifier (UE ID) indicating the UE 100 are associated.

The discovery signal list may include information indicating a content of the D2D communication performed by the UE 100 assigned with the Discovery identifier. The content of the D2D communication indicates, for example, a purpose for the D2D communication (for advertisement delivery, for example) and a content of the D2D communication (content of the advertisement, for example).

The discovery signal list may include information indicating an application used for the D2D communication performed by the UE 100 assigned with the Discovery identifier.

The discovery signal list may include, in the PLMN to which the UE 100 assigned with the Discovery identifier belongs, resource information on the D2D communication resource that is a time-frequency resource used for the D2D communication (Communication).

The resource information includes frequency resource information on the frequency (frequency band) of the D2D communication resource. The frequency resource information includes information indicating a center frequency of the frequency band of the D2D communication resource in the PLMN to which the UE 100 belongs, and information indicating a bandwidth of the frequency band of the D2D communication resource in the PLMN to which the UE 100 belongs. The frequency resource information may be information indicating an operation band of the D2D communication resource available in the cell (eNB 200) in which the UE 100 exists. Further, the frequency resource information may include a resource block number within the operation band.

Further, the resource information includes time resource information on a time of the D2D communication resource in the PLMN to which the UE 100 belongs. The time resource information is at least one of: a system frame number, a subframe number, a start/terminate subframe, and a transmission period.

The discovery signal list may include information indicating a period of validity of the Discovery identifier assigned to the UE 100.

In the present embodiment, each of the eNB 200, an intra PLMN server that is a server arranged within the PLMN, and an extra PLMN server that is a server arranged outside the PLMN holds the discovery signal list. In the present embodiment, the intra PLMN server corresponds to a management node, and the extra PLMN server corresponds to a management server. The extra PLMN server is an independent server not belonging to any PLMN, and is a third party server.

Here, the Discovery identifier includes a local Discovery identifier assigned, in each of a plurality of PLMNs, to the UE 100, and a global Discovery identifier assigned to the UE 100 irrespective of any one of the plurality of PLMNs. The local Discovery identifier is a Discovery identifier dependent on the PLMN, and is a Discovery identifier unique only within the assigned PLMN. On the other hand, the global Discovery identifier is a Discovery identifier not dependent on the PLMN, and is a Discovery identifier unique in a plurality of PLMNs (PLMNs around the world).

The intra PLMN server manages the local Discovery identifier assigned in a self PLMN, and assigns the local Discovery identifier to the UE 100 belonging to the self PLMN. The intra PLMN server holds the discovery signal list regarding the Discovery identifier assigned in the self PLMN.

The eNB 200 manages the local Discovery identifier assigned to the UE 100 that exists in a self cell, out of the local Discovery identifiers assigned to the UE 100 in the PLMN to which the eNB 200 belongs. The eNB 200 holds the discovery signal list regarding the local Discovery identifier assigned to the UE 100 that exists in the self cell.

The extra PLMN server manages at least either one of the Discovery identifiers, that is, the local Discovery identifier assigned, in each of a plurality of PLMNs, to the UE 100, and the global Discovery identifier assigned to the UE 100 irrespective of any one of the plurality of PLMNs. The extra PLMN server assigns the global Discovery identifier to the UE 100, irrespective of the PLMN. The extra PLMN server holds the discovery signal list regarding at least either one of the Discovery identifiers, that is, the local Discovery identifier assigned, in each of the plurality of PLMNs, to the UE 100, and the global Discovery identifier.

When the Discovery identifier is not held or when the period of validity of the Discovery identifier expires, the UE 100 requests, before transmitting the Discovery signal, the Discovery identifier. When requesting the local Discovery identifier (that is, the Discovery identifier unique only within the PLMN to which the UE 100 belongs), the UE 100 is capable of requesting the Discovery identifier to the intra PLMN server or the eNB 200 that manages the cell in which the UE 100 exists. When requesting the global Discovery identifier, the UE 100 is capable of requesting the Discovery identifier to the extra PLMN server.

The UE 100 includes the UE identifier indicating the UE 100, into the request. It is noted that when requesting the global Discovery identifier, the UE 100 may include a UE-specific identifier (telephone number, for example) not dependent on the PLMN, into the request. Further, the UE 100 may include the information indicating the content of the D2D communication, into the request. Alternatively, the UE 100 may include the information indicating the application used for the D2D communication, into the request.

When receiving the request for the local Discovery identifier, or when receiving the request for the Discovery identifier not explicitly indicating that the Discovery identifier to be requested is the global Discovery identifier, the eNB 200 and/or the intra PLMN server assigns the local Discovery identifier to the UE 100. When assigning the Discovery identifier to the UE 100, the eNB 200 and/or the intra PLMN server records the identifier of the UE 100 and the assigned Discovery identifier in an associated manner, and updates the discovery signal list. It is noted that when receiving the request for the global Discovery identifier, the eNB 200 and the intra PLMN server transfer the request to the extra PLMN server.

On the other hand, when receiving the request for the global Discovery identifier, the extra PLMN server assigns the global Discovery identifier to the UE 100. When assigning the Discovery identifier to the UE 100, the extra PLMN server records the identifier of the UE 100 and the assigned Discovery identifier in an associated manner, and updates the discovery signal list.

When assigning the Discovery identifier to the UE 100, the intra PLMN server may inform the extra PLMN server of information on the UE 100 including the assigned Discovery identifier. The extra PLMN server is capable of updating the held discovery signal list on the basis of the information. Further, the intra PLMN server may inform the eNB 200 that manages the cell in which the UE 100 assigned with the Discovery identifier exists, of the information. The eNB 200 is capable of updating the held discovery signal list on the basis of the information.

When assigning the Discovery identifier to the UE 100, the eNB 200 may inform the intra PLMN server of information on the UE 100 including the assigned Discovery identifier. The intra PLMN server is capable of updating the held discovery signal list on the basis of the information. Further, the eNB 200 may notify the extra PLMN server of the information. The extra PLMN server is capable of updating the held discovery signal list on the basis of the information.

Operation According to Embodiment

An operation pattern according to the embodiment will be described, below.

(A) Operation Pattern 1

Figure 6:
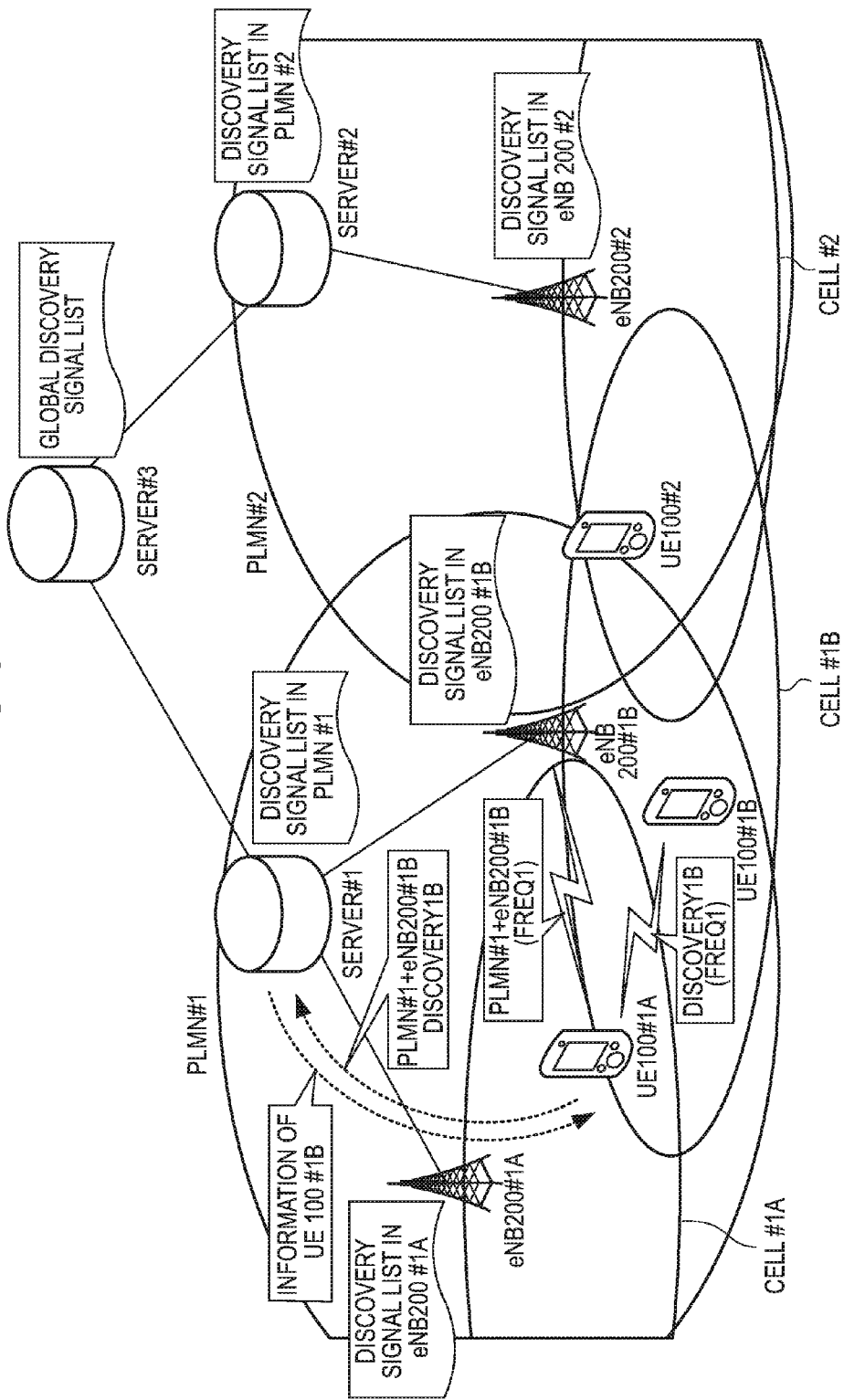
FIG. 6 is a diagram showing an operation environment according to an operation pattern 1 according to the embodiment.
Figure 7:
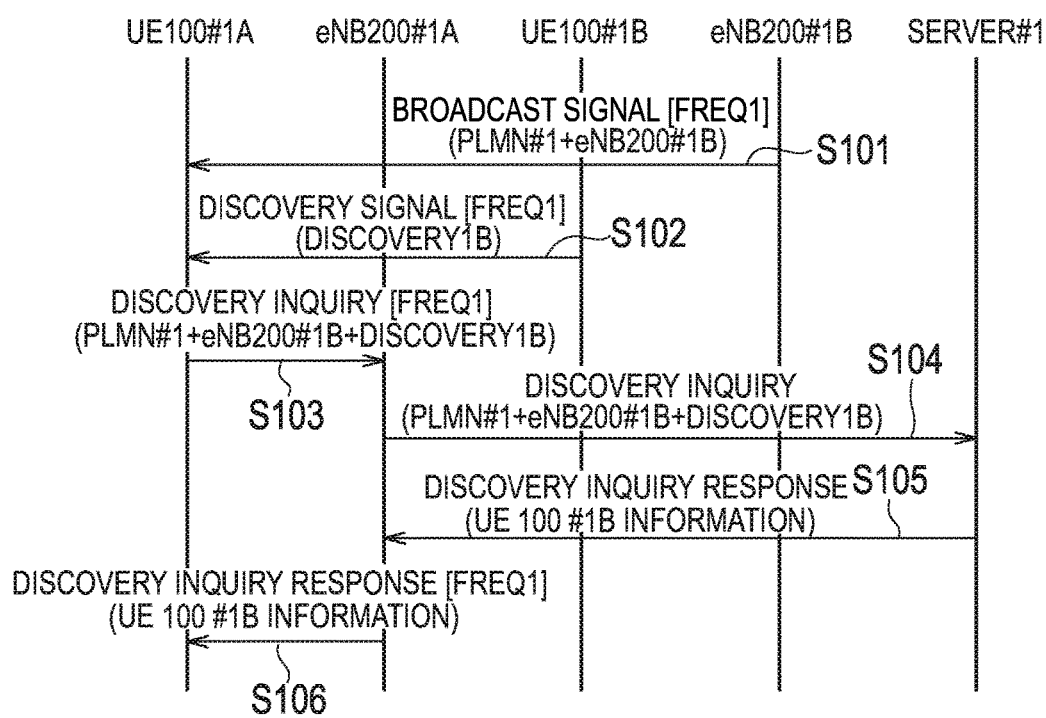
FIG. 7 is a sequence diagram according to the operation pattern 1 according to the embodiment.

An operation pattern 1 will be described using FIG. 6 and FIG. 7. FIG. 6 is a diagram showing an operation environment according to the operation pattern 1. FIG. 7 is a sequence diagram according to the operation pattern 1.

As shown in FIG. 6, an eNB 200 #1A is comprised in a PLMN #1 that is an LTE network of a network operator #1. The PLMN #1 is assigned with a frequency band #1 (freq1). The eNB 200 #1A manages a cell #1A of the frequency band #1. The eNB 200 #1A holds a discovery signal list (a discovery signal list in the eNB 200 #1) regarding the local Discovery identifier assigned to the UE 100 that exists in the cell #1A that is a self cell.

The UE 100 #1A exists in the cell #1A, and performs a location registration in the PLMN #1. In other words, the UE 100 #1A belongs to the PLMN #1. For example, the UE 100 #1A is in an RRC idle state in the cell #1A. Alternatively, the UE 100 #1A may be in an RRC connected state in the cell #1A.

An eNB 200 #1B is comprised in the PLMN #1 that is the LTE network of the network operator #1. The eNB 200 #1B manages a cell #1B of the frequency band #1. The cell #1B is a cell different from the cell #1A. In the present embodiment, the cell #1B is located near the cell #1A. The cell #1B is a neighboring cell of the cell #1A, and overlaps in part with the cell #1A. The eNB 200 #1B is synchronized with the eNB 200 #1A. Alternatively, the eNB 200 #1B may be asynchronized with the eNB 200 #1A. The eNB 200 #1B holds a discovery signal list (a discovery signal list in the eNB 200 #1B) regarding the local Discovery identifier assigned to the UE 100 that exists in the cell #1B.

The UE 100 #1B exists in the cell #1B, and performs a location registration in the PLMN #1. That is, the UE 100 #1B belongs to the PLMN #1. For example, the UE 100 #1B is in an RRC idle state in the cell #1B. Alternatively, the UE 100 #1B may be in an RRC connected state in the cell #1B.

The eNB 200 #2 is comprised in a PLMN #2 that is an LTE network of a network operator #2. The PLMN #2 is assigned with a frequency band #2 (freq2). The eNB 200 #2 manages a cell #2 of the frequency band #2. The cell #2 is a cell different from the cell #1A and the cell 1B. In the present embodiment, the cell #2 is located near the cell #1B. The cell #2 is a neighboring cell of the cell #1B, and overlaps the cell #1B. The eNB 200 #2 is synchronized with the eNB 200 #1B. Alternatively, the eNB 200 #2 may be asynchronized with the eNB 200 #1B. The eNB 200 #2 holds a discovery signal list (a discovery signal list in the eNB 200 #1B) regarding the local Discovery identifier assigned to the UE 100 that exists in the cell #2.

The UE 100 #2 exists in the cell #2, and performs a location registration in the PLMN #2. That is, the UE 100 #2 belongs to the PLMN #2. The UE 100 #2 is in an RRC idle state in the cell #2. Alternatively, the UE 100 #2 may be in an RRC connected state in the cell #2.

A Server #1 is an intra PLMN server belonging to the PLMN #1. The Server #1 is an upper server of the eNB 200 #1A and the eNB 200 #1B, and is connected to each of the eNB 200 #1A and the eNB 200 #1B. The Server #1 holds a discovery signal list regarding the Discovery identifier assigned in the PLMN #1.

A Server #2 is an intra PLMN server belonging to the PLMN #2. The Server #2 is an upper server of the eNB 200 #2, and is connected to the eNB 200 #2. The Server #2 holds a discovery signal list regarding the Discovery identifier assigned in the PLMN #2.

A Server #3 is an extra PLMN server not belonging to the PLMN #1 and the PLMN #2. The Server #2 is an upper server of the Server #1 and the Server #2, and is connected to the Server #1 and the Server 2. In the present embodiment, the Server 3 holds a discovery signal list (Global Discovery Signal List) regarding the global Discovery identifier assigned, irrespective of the PLMN #1 and the PLMN #2, to the UE 100.

In such an operation environment, a case is assumed where the D2D proximity service described above is applied to each UE 100.

In the operation pattern 1, a case will be described where the UE 100 #1B transmits the Discovery signal and the UE 100 #1A receives the Discovery signal. Therefore, the operation pattern 1 discusses a case where the UE 100 #1A receives the Discovery signal from the UE 100 #1B that exists in the same cell. Description proceeds on the assumption that in the operation pattern 1, in the UE 100 #1B, the local Discovery identifier is assigned to the Server #1 or the eNB 200 #1B.

As shown in FIG. 6 and FIG. 7, in step S101, the eNB 200 #1B transmits a broadcast signal by broadcast, in the frequency band #1. The broadcast signal includes the identifier of the eNB 200 #1B (eNB 200 #1B) and the PLMN identifier of the PLMN #1 (PLMN #1) to which the eNB 200 #1B belongs. The UE 100 #1A receives the broadcast signal from the eNB 200 #1B (cell #1B).

In step S102, the UE 100 #1B transmits the Discovery signal, in the frequency band #1. Here, let the information included in the Discovery signal be Discovery 1B. The Discovery 1B includes the local Discovery identifier assigned to the UE 100 #1B. The UE 100 #1A receives the Discovery signal.

In step S103, the UE 100 #1A transmits, in the frequency band #1, a Discovery inquiry that is an inquiry on the transmission-source terminal of the received Discovery signal, to the eNB 200 #1A. The UE 100 #1A is capable of transmitting the Discovery inquiry in order to determine whether or not to perform the D2D communication with the transmission-source terminal of the Discovery signal. Specifically, when not being capable of specifying the transmission-source terminal of the Discovery signal or when wishing to know the content of the D2D communication performed by the transmission-source terminal of the Discovery signal, the UE 100 #1A is capable of transmitting the Discovery inquiry.

The UE 100 #1A transmits the Discovery inquiry including the Discovery identifier (Discovery 1B) included in the received Discovery signal. Further, when there is a possibility that the Discovery signal from the UE that exists in another cell is received, the UE 100 #1A is capable of transmitting the Discovery inquiry including identification information on the other cell. For example, when receiving the radio signal from the other cell, the UE 100 #1A determines that there is a possibility that the Discovery signal from the UE that exists in the other cell is received.

The identification information on the other cell is identification information included in the broadcast information from the other cell. In the present embodiment, the identification information is the PLMN identifier indicating the PLMN #1 and the identifier of the eNB 200 #1B. Therefore, the Discovery inquiry includes the identifier indicating the PLMN #1 and the identifier of the eNB 200 #1B. It is noted that the identifier of the UE 100 #1A that is the transmission source of the Discovery inquiry is also included. It is noted that the identification information on the other cell may be an identifier (a cell ID, a cell global ID (ECGI)) indicating a cell.

When receiving the Discovery inquiry, the eNB 200 #1A determines whether or not to respond to the Discovery inquiry. A detailed determination method will be described later. Description proceeds on the assumption that in the operation pattern 1, the eNB 200 #1A determines not to respond to the Discovery inquiry.

In step S104, the eNB 200 #1A transfers the Discovery inquiry from the UE 100 #1A, to the Server #1 that is an upper server. When receiving the Discovery inquiry, the Server #1 determines whether or not to respond to the Discovery inquiry. A detailed determination method will be described later. Description proceeds on the assumption that in the operation pattern 1, the eNB 200 #1A determines to respond to the Discovery inquiry.

The Server #1 specifies, on the basis of the Discovery inquiry and held discovery signal list, the UE 100 #1B assigned with the Discovery identifier included in the Discovery inquiry.

In step S105, the Server #1 transmits a Discovery inquiry response, to the eNB 200 #1A. The Discovery inquiry response includes information on the UE 100 #1B that has transmitted the Discovery signal (UE 100 #1B information). Specifically, the UE 100 #1B information includes the UE identifier indicating the UE 100 #1B. Further, the UE 100 #1B information may include information indicating at least either one of information indicating the content of the D2D communication performed by the UE 100 #1B, and/or, information indicating the application used for the D2D communication performed by the UE 100 #1B.

In step S106, the eNB 200 #1A transmits, in the frequency band #1, the Discovery inquiry response received from the Server #1, to the UE 100 #1A. The UE 100 #1A receives the Discovery inquiry response (UE 100 #1B information). This allows the UE 100 #1A to know the information on the UE 100 #1B that is the transmission-source terminal of the received Discovery signal. This allows the UE 100 #1A to indicate the information on the UE 100 #1B, on the user interface 120. A user of the UE 100 #1A is capable of determining whether or not to perform the D2D communication with the UE 100 #1B. Alternatively, when the identifier of the UE 100 #1B is registered, as a partner terminal of the D2D communication, in the memory 150, the UE 100 #1A may decide to perform the D2D communication with the UE 100 #1B. Further, the UE 100 #1A may decide to perform the D2D communication with the UE 100 #1B, when the information indicating the content of the D2D communication included in the UE 100 #1B information and/or the information indicating the application used for the D2D communication is registered, as the information preferred by the user, in the memory 150.

It is noted that the UE 100 #1A is capable of determining whether or not the D2D communication is desired by the user of the UE 100 #1A, even when not actually performing the D2D communication, and thus, the UE 100 #1A is capable of avoiding to perform the unnecessary D2D communication.

According to the operation pattern 1, the Server #1 receives the Discovery inquiry. When the UE 100 #1B belongs to the PLMN #1, the Server #1 that has received the Discovery inquiry, instead of the Server #3, notifies the UE 100 #1A of the Discovery inquiry response, on the basis of the Discovery identifier included in the Discovery inquiry. This prevents the Discovery inquiry from being concentrated in the Server #3, and thus, it is possible to inhibit a decrease in network efficiency.

(B) Operation Pattern 2

Figure 8:
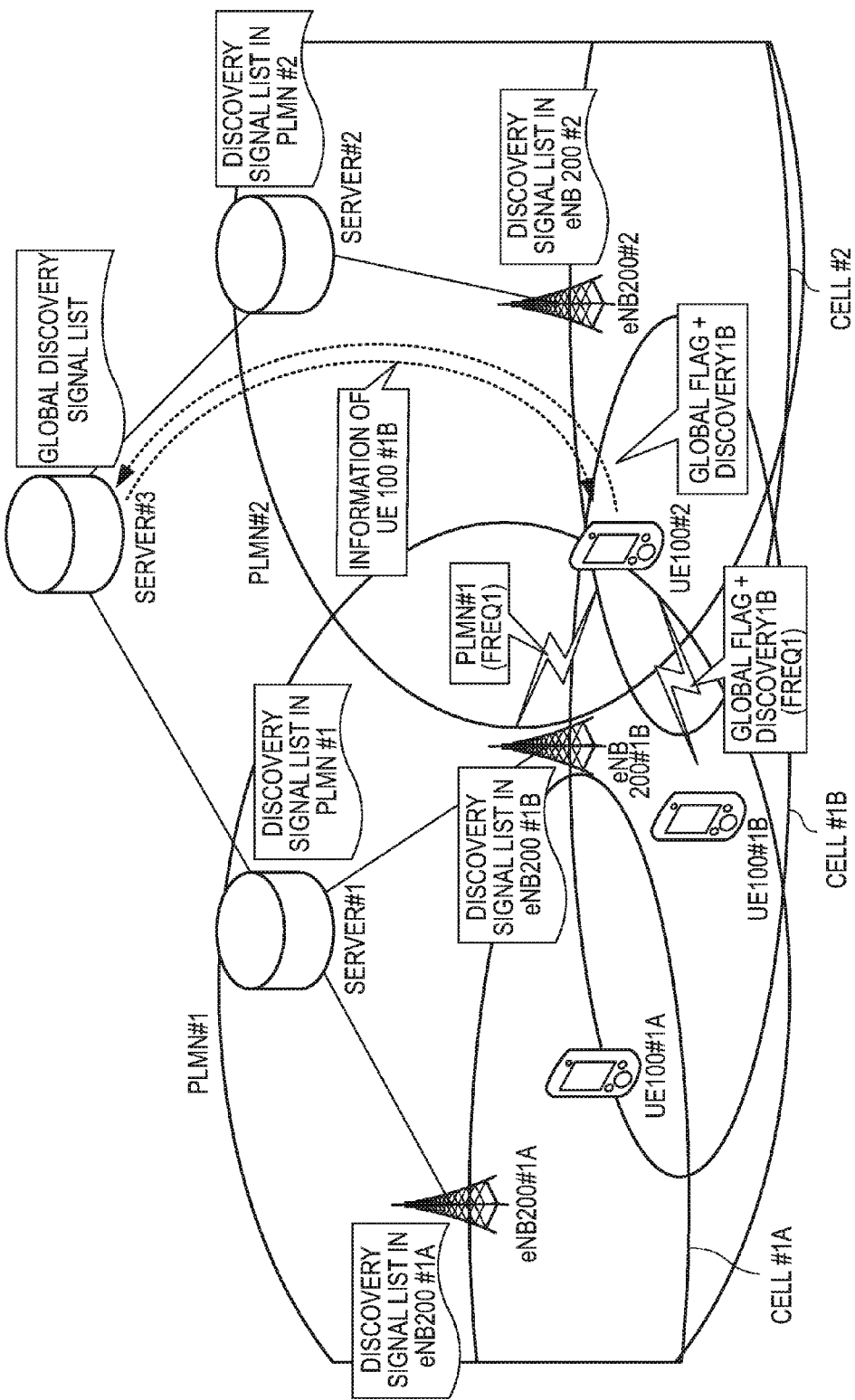
FIG. 8 is a diagram showing an operation environment according to an operation pattern 2 according to the embodiment.
Figure 9:
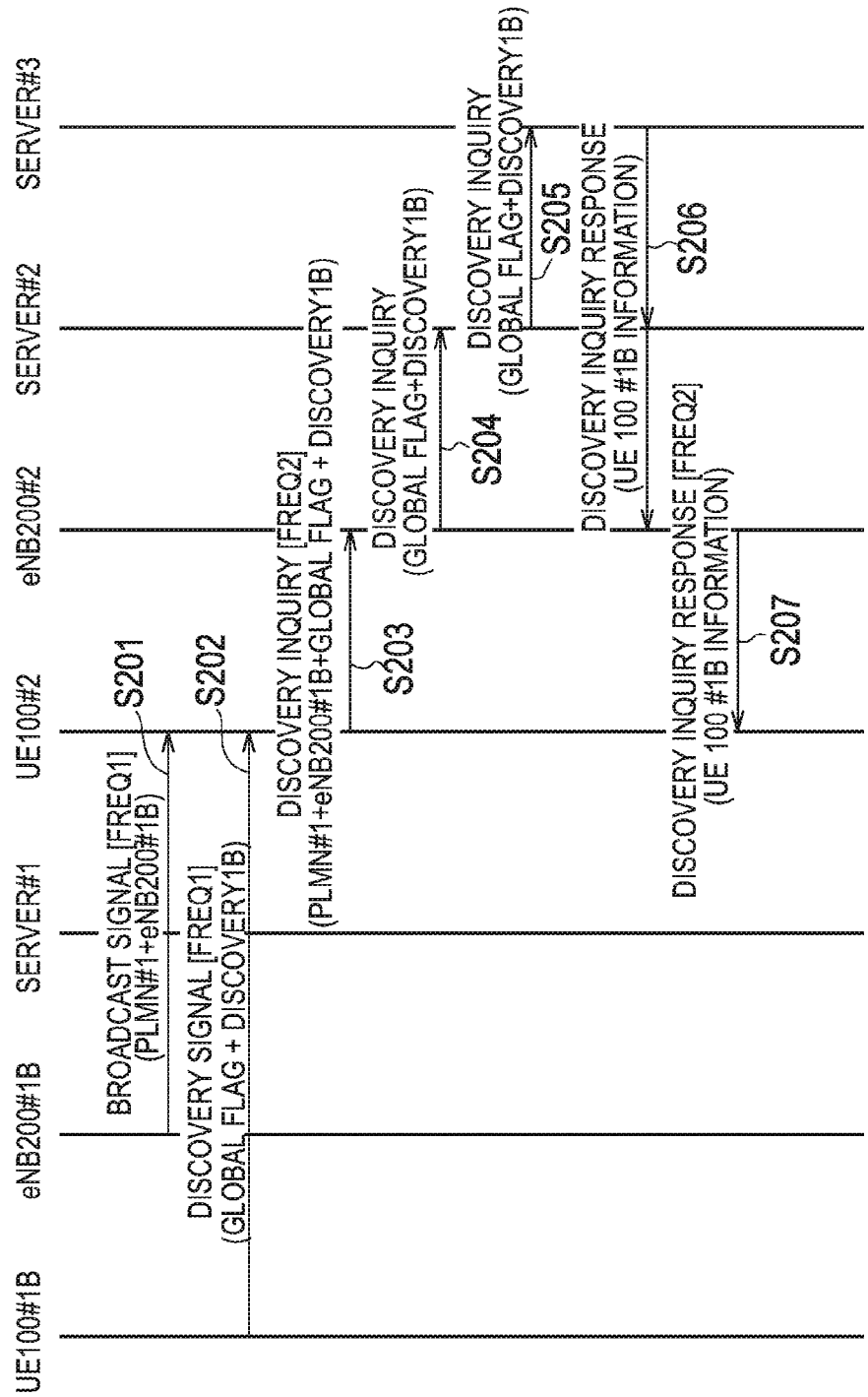
FIG. 9 is a sequence diagram according to the operation pattern 2 according to the embodiment.

Next, an operation pattern 2 will be described using FIG. 8 and FIG. 9. FIG. 8 is a diagram showing an operation environment according to the operation pattern 2. FIG. 9 is a sequence diagram according to the operation pattern 2. A part that is the same as in the operation pattern 1 will be omitted, where necessary.

The operation pattern 1 discusses a case where the UE 100 #1A receives the Discovery signal from the UE 100 #1B that exists in the same cell. The operation pattern 2 discusses a case where the UE 100 #1B transmits the Discovery signal and the UE 100 #2 receives the Discovery signal. That is, the operation pattern 2 discusses a case where the UE 100 #2 receives the Discovery signal from the UE 100 #1B belonging to a different PLMN. Description proceeds on the assumption that in the operation pattern 2, the UE 100 #1B is assigned with the global Discovery identifier from the Server #3.

As shown in FIG. 8 and FIG. 9, step S201 corresponds to step S101. In the operation pattern 2, the UE 100 #2 receives the broadcast signal from the eNB 200 #1B.

Step S202 corresponds to step S102. In the operation pattern 2, the UE 100 #2 receives the Discovery signal from the UE 100 #1B. The Discovery signal includes global flag information. The global flag information is information indicating whether or not the Discovery identifier included in the Discovery signal is the global Discovery identifier. Specifically, the global flag being ON indicates that the Discovery identifier included in the Discovery signal is the global Discovery identifier. On the other hand, the global flag being OFF indicates that the Discovery identifier included in the Discovery signal is the local Discovery identifier.

When transmitting the Discovery signal including the global Discovery identifier, the UE 100 #1B is capable of including the global flag information indicating that the global flag is ON, into the Discovery signal. On the other hand, when transmitting the Discovery signal including the local Discovery identifier, the UE 100 #1B is capable of including the global flag information indicating that the global flag is OFF, into the Discovery signal. Alternatively, the UE 100 #1B is capable of transmitting the Discovery signal not including the global flag information.

Description proceeds on the assumption that the UE 100 #1B has transmitted the Discovery signal including the global flag information indicating that the global flag is ON.

In step S203, the UE 100 #2 transmits, in the frequency band #2, the Discovery inquiry to the eNB 200 #2. The Discovery inquiry includes the global flag information that has been included in the received Discovery signal. The remaining operation is similar to step S103.

When receiving the Discovery inquiry, the eNB 200 #2 determines whether or not to respond to the Discovery inquiry. A detailed determination method will be described later. Description proceeds on the assumption that in the operation pattern 2, the eNB 200 #2 determines not to respond to the Discovery inquiry from the UE 100 #2.

In step S204, the eNB 200 #2 transfers the Discovery inquiry from the UE 100 #2, to the Server #2 that is an upper server. It is noted that the global flag information included in the received Discovery inquiry indicates that the global flag is ON, and thus, the eNB 200 #2 does not include the identifiers of the PLMN #1 and the eNB 200 #1B, into the Discovery inquiry to be transmitted (transferred). When receiving the Discovery inquiry, the Server 2 determines whether or not to respond to the Discovery inquiry. A detailed determination method will be described later. Description proceeds on the assumption that in the operation pattern 2, the eNB 200 #2 determines not to respond to the Discovery inquiry.

In step S205, the Server #2 transfers the received Discovery inquiry to the Server #3 that is an upper server. When receiving the Discovery inquiry, the Server #3 determines whether or not to respond to the Discovery inquiry. A detailed determination method will be described later. Description proceeds on the assumption that in the operation pattern 2, the Server #3 determines to respond to the Discovery inquiry.

The Server #3 specifies, on the basis of the Discovery inquiry and held discovery signal list, the UE 100 #1B assigned with the global Discovery identifier included in the Discovery inquiry.

In step S206, the Server #3 transmits the Discovery inquiry response, via the Server 2 to the eNB 200 #2.

In step S207, the eNB 200 #2 transmits, in the frequency band #2, the Discovery inquiry response received via the Server #2 from the Server #3, to the UE 100 #2. The UE 100 #2 receives the Discovery inquiry response (UE 100 #1B information).

According to the operation pattern 2, the Server #3 receives the Discovery inquiry. The Server #3 notifies, on the basis of the Discovery identifier included in the Discovery inquiry, the UE 100 #2 of the Discovery inquiry response including information on the UE 100 #1B belonging to a different PLMN. This allows the UE 100 #2 to know the information on the UE 100 #1B belonging to the different PLMN.

(C) Operation Pattern 3

Figure 10:
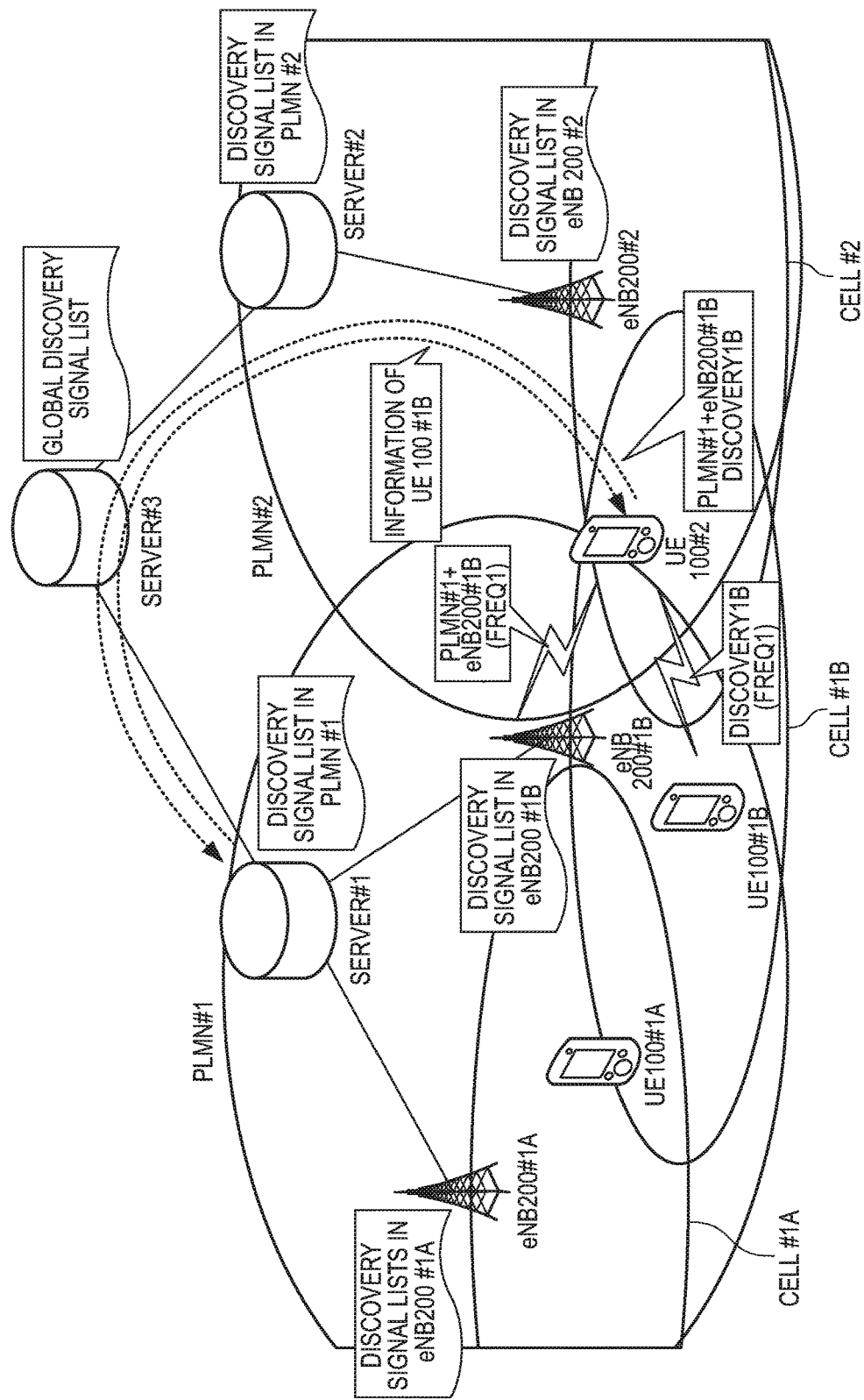
FIG. 10 is a diagram showing an operation environment according to an operation pattern 3 according to the embodiment.
Figure 11:
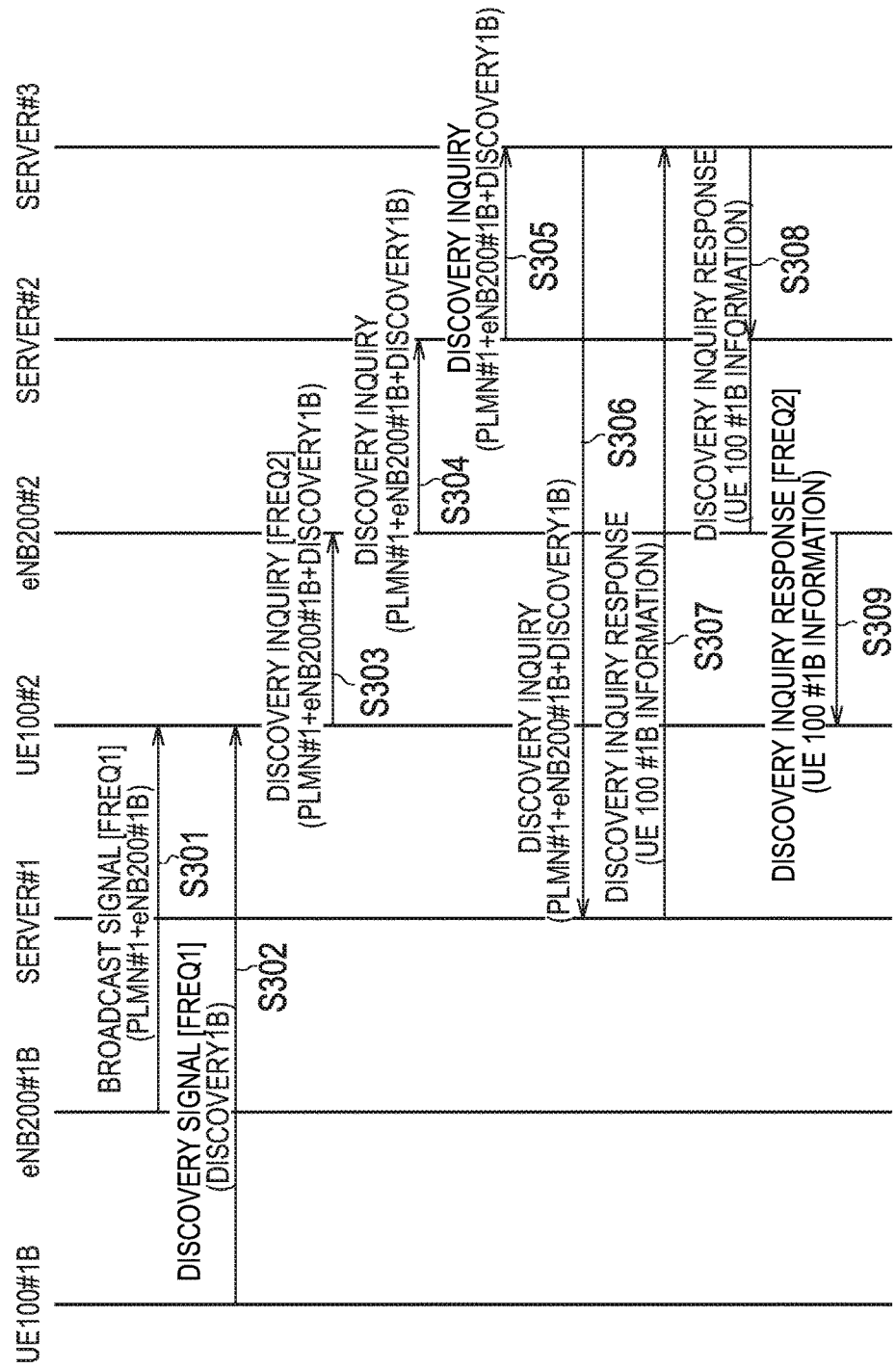
FIG. 11 is a sequence diagram according to the operation pattern 3 according to the embodiment.

Next, an operation pattern 3 will be described using FIG. 10 and FIG. 11. FIG. 10 is a diagram showing an operation environment according to the operation pattern 3. FIG. 11 is a sequence diagram according to the operation pattern 3. A part that is the same as in the operation patterns 1 and 2 will be omitted, where necessary.

The operation pattern 2 discusses a case where the Server #3 determines to respond to the Discovery inquiry. The operation pattern 3 discusses a case where the Server #3 determines not to respond to the Discovery inquiry. Description proceeds on the assumption that in the operation pattern 3, in the UE 100 #1B, the local Discovery identifier is assigned to the Server #1 or the eNB 200 #1B.

As shown in FIG. 10 and FIG. 11, step S301 corresponds to step S201.

In step S302, the UE 100 #1B transmits the Discovery signal including the local Discovery identifier. The UE 100 #2 receives the Discovery signal from the UE 100 #1B. The UE 100 #1B includes the local Discovery identifier into the Discovery signal, and thus, the Discovery signal does not include the Global flag information. It is noted that the UE 100 #1B, the Discovery signal, may transmit the Discovery signal including the Global flag information indicating that the Global flag is OFF.

In step S303, in much the same way as in step S103, the UE 100 #2 transmits, in the frequency band #2, the Discovery inquiry to the eNB 200 #2.

Step S304 corresponds to step S104.

In step S305, when receiving the Discovery inquiry, the Server #3 determines whether or not to respond to the Discovery inquiry. Description proceeds on the assumption that in the operation pattern 3, the Server #3 determines not to respond to the Discovery inquiry.

In step S306, the Server #3 transfers, on the basis of the identifier of the PLMN #1 included in the Discovery inquiry, to the Server #1 of the PLMN #1. The Server #1 specifies, on the basis of the Discovery inquiry and held discovery signal list, the UE 100 #1B assigned with the Discovery identifier included in the Discovery inquiry.

In step S307, the Server #1 transmits the Discovery inquiry response, to the Server #3.

Steps S308 and S309 correspond to steps S206 and S207.

According to the operation pattern 3, when the UE 100 #1B that is the transmission-source terminal of the Discovery signal belongs to the PLMN #1, the Server #3 transfers the Discovery inquiry to the Server #1 arranged within the PLMN #1. Thus, instead of the Server #3, the Server #1 notifies, on the basis of the Discovery identifier included in the Discovery inquiry, the E 100 #2 of the Discovery inquiry response, via the Server #2 and the Server #3. This prevents the Server #3 from specifying the transmission-source terminal of the Discovery signal, and thus, it is possible to decrease a load concentration into the Server #3.

(Determination as to Discovery Inquiry Response)

Figure 12:
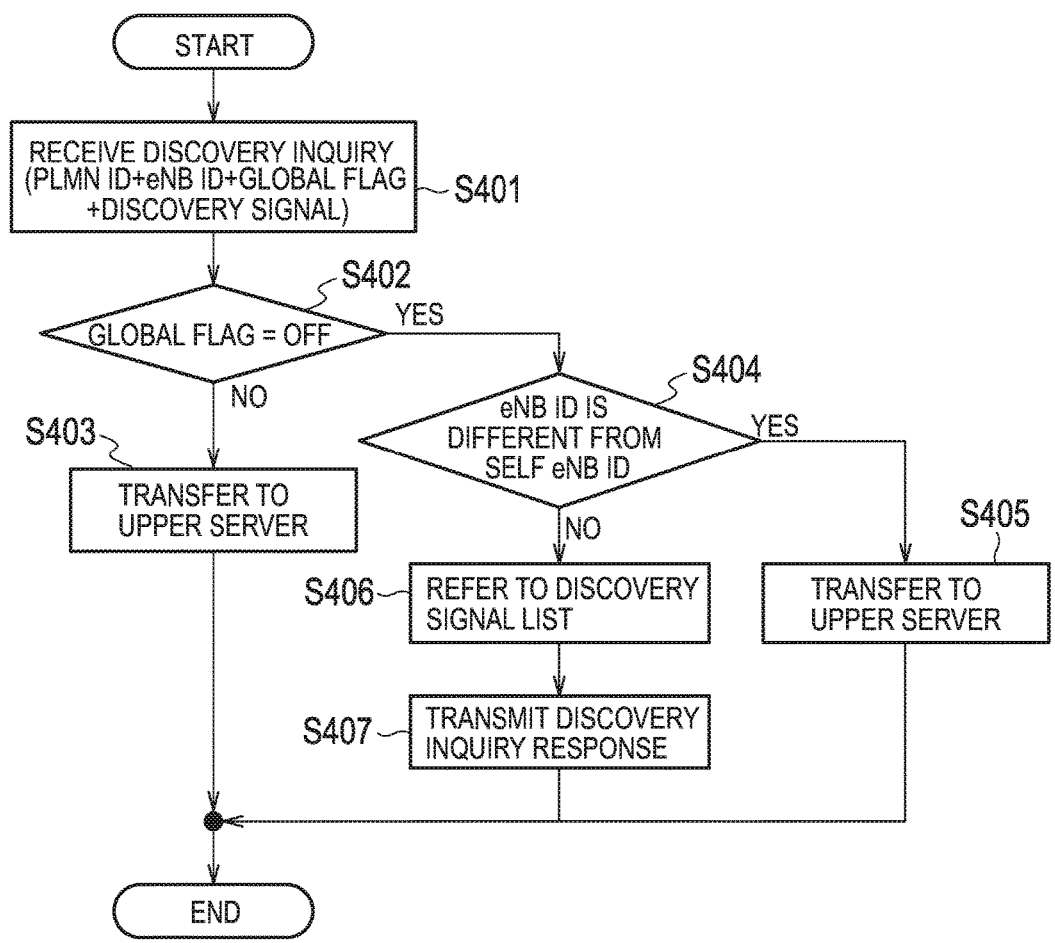
FIG. 12 is a flowchart for describing a determination operation of an eNB 200 according to the embodiment.
Figure 13:
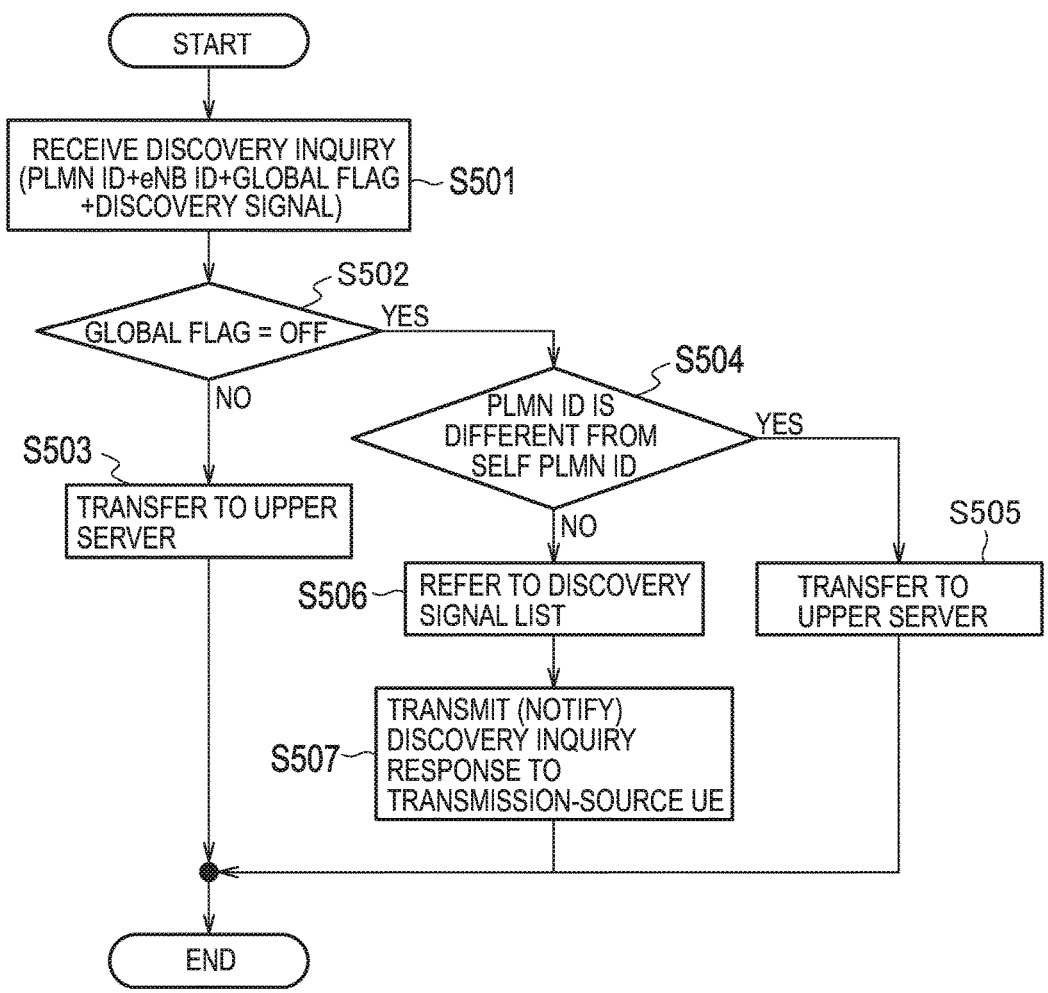
FIG. 13 is a flowchart for describing a determination operation of an intra PLMN server according to the embodiment.
Figure 14:
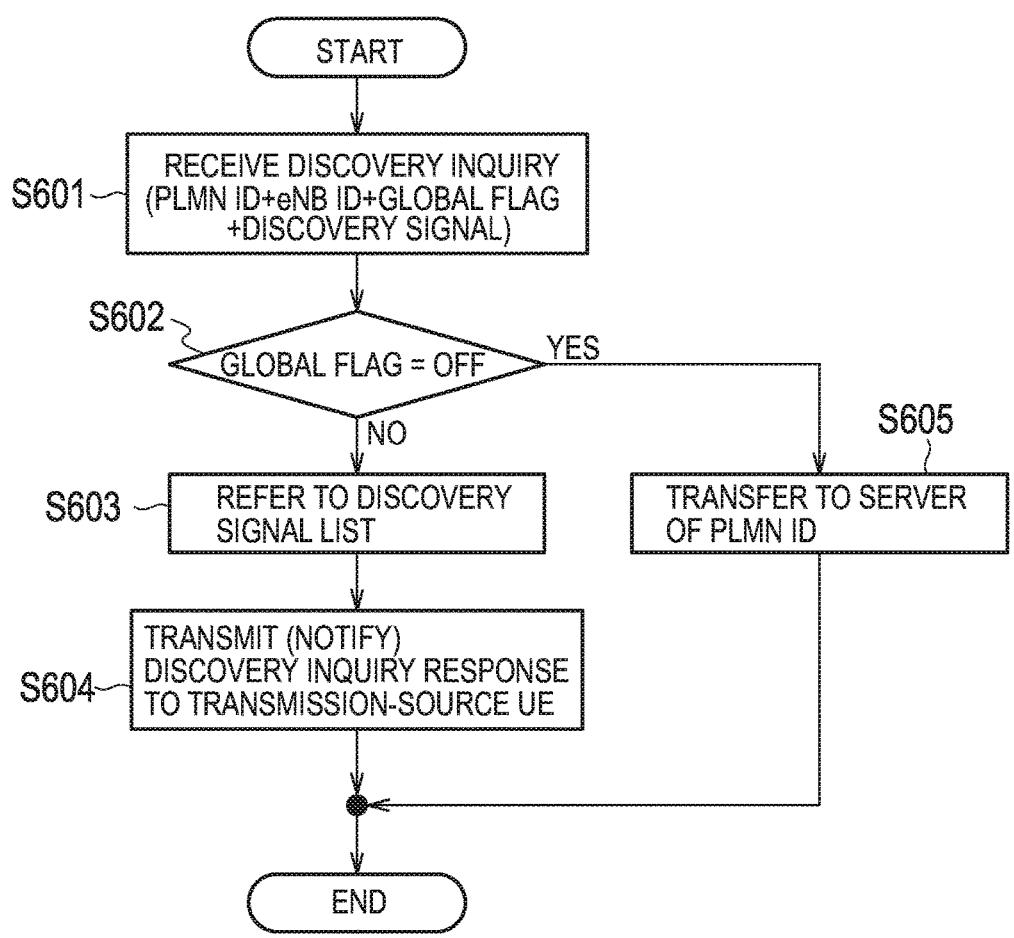
FIG. 14 is a flowchart for describing a determination operation of an extra PLMN server according to the embodiment.

Next, a determination as to the Discovery inquiry response will be described using FIG. 12 and FIG. 14. FIG. 12 is a flowchart for describing a determination operation of the eNB 200 according to the embodiment. FIG. 13 is a flowchart for describing a determination operation of the intra PLMN server according to the embodiment. FIG. 14 is a flowchart for describing a determination operation of the extra PLMN server according to the embodiment.

(A) Determination Operation of eNB 200

The determination operation as to whether the eNB 200 performs the Discovery inquiry response will be described using FIG. 12.

As illustrated in FIG. 12, in step S401, the eNB 200 receives the Discovery inquiry. The Discovery inquiry includes the information included in the received Discovery signal (Discovery signal). The information includes the Discovery identifier. Further, the Discovery inquiry may include the identifier of the PLMN (PLMN ID), the identifier of the eNB (eNB ID), and the Global flag information (Global flag), for example.

In step S402, the eNB 200 determines whether or not the Discovery identifier included in the Discovery inquiry is the global Discovery identifier. When the Discovery identifier included in the Discovery inquiry is the global Discovery identifier (that is, the Global flag is ON), a process of step S403 is executed, and otherwise (that is, when the Global flag is OFF), a process of step S404 is executed.

In step S403, the eNB 200 transfers the Discovery inquiry to the upper server (Server #1 (Server #2) or the Server #3). That is, the eNB 200 determines not to respond to the Discovery inquiry. Thereafter, the eNB 200 ends the process.

In step S404, the eNB 200 determines whether or not the identifier of the eNB 200 included in the Discovery inquiry matches the identifier of itself (eNB 200). That is, the eNB 200 determines whether or not the transmission-source terminal of the Discovery signal exists in the self cell. When these identifiers are different, the eNB 200 executes a process of step S405, and otherwise (when these identifiers match), executes a process of step S406.

Further, when the cell identifier is included in the Discovery inquiry, the eNB 200 determines, in a similar manner, whether or not the cell identifier included in the Discovery inquiry matches the identifier of self cell.

It is noted that when these identifiers are not included in the Discovery inquiry, the eNB 200 executes the process of step 405.

In step S405, the eNB 200 transfers the Discovery inquiry to the upper server. That is, the eNB 200 determines not to respond to the Discovery inquiry. Thereafter, the eNB 200 ends the process. When the transmission-source terminal of the Discovery signal does not exist in the self cell, the eNB 200 is capable of transferring the Discovery inquiry to the upper server, and as a result, it is possible to efficiently specify the transmission-source terminal of the Discovery signal.

In step S406, the eNB 200 determines to respond to the Discovery inquiry, and refers to the discovery signal list. If it is determined as a result of referring to the discovery signal list that the Discovery identifier included in the Discovery inquiry is included in the discovery signal list, the eNB 200 specifies the UE 100 corresponding to the Discovery identifier and generates the Discovery inquiry response.

It is noted that when the Discovery identifier included in the Discovery inquiry is not included in the discovery signal list, the eNB 200 executes the process of step 405.

In step S407, the eNB 200 transmits the Discovery inquiry response to the UE 100 (notifies the UE 100 of the Discovery inquiry response). The eNB 200, instead of the Server #1 (Server #2) and the Server #3, responds to the Discovery inquiry, and thus, the signaling is decreased, hence it is possible to reduce the load of the network.

(B) Intra PLMN Server (Server #1, Server #2)

Next, a determination operation as to whether or not the intra PLMN server (hereinafter, appropriately referred to as "Server #1") performs the Discovery inquiry response, will be described using FIG. 13.

As shown in FIG. 13, in step S501, the Server #1 receives the Discovery inquiry.

Steps S502 and S503 correspond to steps S402 and S403.

In step S504, the Server #1 determines whether or not the identifier of the PLMN included in the Discovery inquiry matches the PLMN to which itself (Server #1) belongs. That is, the Server #1 determines whether or not the transmission-source terminal of the Discovery signal belongs to the self PLMN. When these identifiers are different, the Server #1 executes a process of step S505, and otherwise (when these identifiers match), executes a process of step S506.

It is noted that when the identifier of the PLMN is not included in the Discovery inquiry, the Server #1 executes the process of step 505. When the transmission-source terminal of the Discovery signal does not belong to the self PLMN, the Server #1 is capable of transferring the Discovery inquiry to the Server #3 that is the upper server, and as a result, it is possible to efficiently specify the transmission-source terminal of the Discovery signal.

Steps S505 to S507 correspond to steps S405 to S407. It is noted that in step S505, the Server #1 may transfer, on the basis of the PLMN identifier included in the Discovery inquiry, the Discovery inquiry, without transferring to the Server #3, to a management server (the Server #2, for example) belonging to another PLMN. As a result, it is possible to reduce a load concentration into the Server #3.

It is noted that when the Discovery identifier included in the Discovery inquiry is not included in the discovery signal list, the eNB 200 executes the process of step 505.

(C) Extra PLMN Server (Server #3)

Next, a determination operation as to whether or not the extra PLMN server (hereinafter, appropriately referred to as "Server #3") performs the Discovery inquiry response, will be described using FIG. 14.

As shown in FIG. 14, in step S601, the Server #3 receives the Discovery inquiry.

In step S602, when the Discovery identifier included in the Discovery inquiry is the global Discovery identifier (that is, when the Global flag is ON), the Server #3 executes a process of step S603, and otherwise (that is, when the Global flag is OFF), executes a process of step S605.

In step S603, the Server #3 determines to respond to the Discovery inquiry, and refers to the discovery signal list regarding the global Discovery identifier. As a result of referring to the discovery signal list, the Server #3 specifies the UE 100 corresponding to the Discovery identifier, and generates the Discovery inquiry response.

Step S604 corresponds to step S407.

On the other hand, in step S605, the Server #3 transfers, on the basis of the identifier of the PLMN included in the Discovery inquiry, the Discovery inquiry to the intra PLMN server belonging to the PLMN indicated by the identifier of the PLMN. As a result, it is possible to reduce a load concentration into the Server #3.

Other Embodiments

In the above-described embodiment, the Server #3 (extra PLMN server) holds the discovery signal list regarding the global Discovery identifier; however, this is not limiting. The Server #3 may hold the discovery signal list regarding the Discovery identifier assigned to the UE 100 in a plurality of PLMNs. For example, the Server #3 may hold a first discovery signal list regarding the Discovery identifier assigned, in the Server #1, to the UE 100, and a second discovery signal list regarding the Discovery identifier assigned, in the Server #2, to the UE 100. The Server #3 may hold a discovery signal list regarding the local Discovery identifier assigned, in each of a plurality of PLMNs, to the UE 100, and a discovery signal list regarding the global Discovery identifier.

The Server #3 that holds the discovery signal list regarding the local Discovery identifier receives update information on the discovery signal list from a plurality of intra PLMN servers formed by each intra PLMN server belonging to each PLMN so as to update the discovery signal list regarding the local Discovery identifier held by the Server #3. The Server #3 may request the update information to the plurality of intra PLMN servers, and each of the plurality of intra PLMN servers may transmit regularly or in response to a predetermined trigger (update of the discovery signal list held by the intra PLMN server) the update information to the Server #3.

In the above-described embodiment, the eNB 200 transfers the Discovery inquiry to the intra PLMN server; however, this is not limiting. For example, when the intra PLMN server is not arranged, the eNB 200 may transfer the Discovery inquiry to the extra PLMN server.

Further, when the extra PLMN server holds the discovery signal list regarding the local Discovery identifier assigned in each of a plurality of PLMNs, the eNB 200 and the intra PLMN server may not respond to the Discovery inquiry, but the extra PLMN server only may respond to the Discovery inquiry.

Further, in the above-described embodiment, one Discovery identifier may be assigned to one UE 100, and for each content of the D2D communication performed by the UE 100 (or the application used for the D2D communication), the Discovery identifier may be assigned. That is, the UE 100 may be assigned with a plurality of Discovery identifiers, and may change, in accordance with a content (or the application) of the D2D communication, the plurality of these Discovery identifiers, into the Discovery identifier to be included in the Discovery signal.

Alternatively, in the above-described embodiment, the local Discovery identifier and the global Discovery identifier may be assigned to one UE 100. In this case, the UE 100 is capable of appropriately and selectively using either the local Discovery identifier or the global Discovery identifier. For example, the UE 100 is capable of selectively using these Discovery identifiers, in accordance with the location of the UE 100. Specifically, the UE 100 is capable of transmitting, in a domestic country, the Discovery signal including the local Discovery identifier, and transmitting, outside the country, the Discovery signal including the global Discovery identifier. Alternatively, when the D2D communication is to be performed on the UE 100 belonging to the self PLMN, the UE 100 may transmit the Discovery signal including the local Discovery identifier, and when the D2D communication is not limitedly to be performed on the UE 100 belonging to the self PLMN, the UE 100 may transmit the Discovery signal including the global Discovery identifier. It is noted that the UE 100 may transmit the Discovery signal including the local Discovery identifier and the global Discovery identifier.

In the described-above embodiment, although an LTE system is described as an example of a mobile communication system, it is not limited to the LTE system, and the present disclosure may be applied to a system other than the LTE system.

The invention claimed is:

1. A communication control method, comprising:
directly transmitting, from a second user terminal to a first user terminal, discovery signal including a first identifier associated with the second user terminal, wherein the discovery signal is for discovering another user terminal;

transmitting, from the first user terminal to a first network apparatus belonging to a first Public Land Mobile Network (PLMN), the first identifier included in the discovery signal;

determining, by the first network apparatus, in response to receiving the first identifier, whether the first identifier is an identifier allocated in the first PLMN;

in response to the first network apparatus determining that the first identifier is not the identifier allocated in the first PLMN:
   sending the first identifier from the first network apparatus to a second network apparatus belonging to a second PLMN;
   sending, from the second network apparatus to the first network apparatus, information of an application used by the second user terminal; and, in response to the first network apparatus determining that the first identifier is the identifier allocated in the first PLMN:
   transmitting, from the first network apparatus to the first user terminal, information of the application used by the second user terminal.

2. A first network apparatus configured to belong to a first Public Land Mobile Network (PLMN), comprising:
   a controller including a processor and a memory coupled to the processor, wherein
   the controller is configured to
   receive a first identifier from a first user terminal, wherein the first identifier is included in a discovery signal which the first user terminal has received from a second user terminal;
   determine, in response to receiving the first identifier, whether the first identifier is an identifier allocated in the first PLMN;

in response to the controller determining that the first identifier is not the identifier allocated in the first PLMN:
      sending the first identifier to a second network apparatus belonging to a second PLMN; and
      receiving the information of an application used by the second user terminal, from the second network apparatus; and in response to the controller determining that the first identifier is the identifier allocated in the first PLMN:
      transmitting, to the first user terminal, information of the application used by the second user terminal.

3. A second network apparatus belonging to a second Public Land Mobile Network (PLMN), comprising:
   a controller including a processor and a memory coupled to the processor, wherein
   the controller is configured to
   receive a first identifier from a first network apparatus belonging to a first PLMN, in response to the first network apparatus determining that the first identifier is not an identifier allocated in the first PLMN; and
   send information of an application used by a second user terminal associated with the first identifier, to the first network apparatus, wherein
   the first identifier is received in the first network apparatus from a first user terminal which directly received a discovery signal including the first identifier from the second user terminal, and
   the discovery signal is for discovering another user terminal.

* * * * *